(12) United States Patent
Abeyasekera et al.

(10) Patent No.: US 12,012,933 B2
(45) Date of Patent: Jun. 18, 2024

(54) METHODS AND SYSTEMS FOR IMPROVING GRID STABILITY

(71) Applicant: VESTAS WIND SYSTEMS A/S, Aarhus N (DK)

(72) Inventors: Tusitha Abeyasekera, Aarhus N (DK); Per Hagen Nielsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/341,956

(22) Filed: Jun. 27, 2023

(65) Prior Publication Data

US 2023/0417220 A1    Dec. 28, 2023

(30) Foreign Application Priority Data

Jun. 28, 2022  (DK) .......................... PA 2022 70345

(51) Int. Cl.
*H02J 3/38* (2006.01)
*F03D 7/02* (2006.01)
*F03D 7/04* (2006.01)

(52) U.S. Cl.
CPC ........... *F03D 7/0284* (2013.01); *F03D 7/048* (2013.01); *H02J 3/381* (2013.01); *H02J 2203/10* (2020.01);
(Continued)

(58) Field of Classification Search
CPC ..... Y02E 40/70; H02J 2300/28; H02J 3/0012; H02J 13/00002; H02J 3/001;
(Continued)

(56) References Cited

U.S. PATENT DOCUMENTS 7,298,059 B2 * 11/2007 Delmerico .............. F03D 7/048
  307/85
7,660,640 B2 * 2/2010 Chen ........................ H02J 3/00
  702/179
(Continued)

FOREIGN PATENT DOCUMENTS

CN        109217302 A     1/2019
CN        112531765 A     3/2021
(Continued)

OTHER PUBLICATIONS

Danish Patent and Trademark Office, First Technical Examination including the Search Report for Application PA 2022 70345 dated Dec. 12, 2022.
(Continued)

*Primary Examiner* — Darrin D Dunn
(74) *Attorney, Agent, or Firm* — Patterson + Sheridan, LLP (57) ABSTRACT

Operating a renewable energy power plant connected to a power network at a point of interconnection. The plant includes: one or more renewable energy generators connected to a collection point of the renewable energy power plant, and a connecting network connecting the collection point to the point of interconnection. One method includes: receiving one or more measurement signals indicative of measured power characteristics of the renewable energy power plant at the point of interconnection; determining a dynamic short circuit ratio (DSCR) at the point of interconnection based on the one or more measurement signals; determining an equivalent dynamic short circuit ratio (EDSCR) at the collection point based on the determined DSCR at the point of interconnection and one or more components of an impedance of the connecting network; and controlling the one or more renewable energy generators by determining
(Continued)

and dispatching active power set points based on the determined EDSCR.

14 Claims, 6 Drawing Sheets

(52) U.S. Cl.
CPC ....... *H02J 2203/20* (2020.01); *H02J 2300/28* (2020.01)

(58) Field of Classification Search
CPC .......... H02J 3/00125; H02J 3/24; H02J 13/00; F03D 7/0284; F03D 7/048; H02P 9/105; G05B 15/02
See application file for complete search history.

(56) References Cited

U.S. PATENT DOCUMENTS

| | | | | |
|---|---|---|---|---|
| 8,198,742 B2* | 6/2012 | Jorgensen | ............... | F03D 7/044 290/44 |
| 8,558,401 B2* | 10/2013 | Girardin | ................. | F03D 80/40 290/44 |
| 9,997,922 B2* | 6/2018 | Beekmann | ............... | H02J 3/381 |
| 10,072,634 B2* | 9/2018 | Busker | ....................... | H02J 3/48 |
| 10,127,568 B2* | 11/2018 | Forbes | ................... | G06Q 10/04 |
| 10,958,071 B2* | 3/2021 | Gupta | ................. | H02J 3/00125 |
| 2013/0015660 A1* | 1/2013 | Hesselbæk | ................ | H02J 3/48 290/44 |
| 2014/0021720 A1* | 1/2014 | Nelson | .................... | H02J 3/381 290/44 |
| 2015/0148974 A1 | 5/2015 | Diedrichs | | |
| 2015/0361954 A1* | 12/2015 | Nelson | .................. | F03D 7/0284 290/44 |
| 2017/0314534 A1* | 11/2017 | Gupta | ..................... | F03D 7/048 |
| 2019/0131795 A1* | 5/2019 | Gadiraju | ................ | F03D 7/0284 |
| 2021/0143642 A1* | 5/2021 | Gupta | .................. | H02J 3/001 |
| 2021/0167601 A1* | 6/2021 | Gupta | ....................... | H02J 3/48 |
| 2022/0205426 A1* | 6/2022 | Brombach | ............. | F03D 7/048 |
| 2022/0393473 A1* | 12/2022 | Xu | ........................ | H02M 7/483 |

FOREIGN PATENT DOCUMENTS

| | | |
|---|---|---|
| CN | 113904375 A | 1/2022 |
| WO | 2021001002 A1 | 1/2021 |

OTHER PUBLICATIONS

European Patent Office, extended European Search Report for Application 23178618.7-1202 dated Jul. 12, 2023.

* cited by examiner

METHODS AND SYSTEMS FOR IMPROVING GRID STABILITY

TECHNICAL FIELD

The present disclosure relates to methods and systems for improving grid stability of a renewable energy power plant connected to a power network.

BACKGROUND

The regulation and general operation of a grid-connected power plant is typically controlled by a power plant control system or controller (PPC), which implements power delivery demands communicated from a Transmission System Operator (TSO) to ensure compliance with operational limits and requirements as set out by the TSO or in country-specific grid interconnection requirements or 'grid codes'.

However, power plants, such as renewable energy power plants, connected to a weak AC power grid have high voltage sensitivity, leading to instability. The grid strength and voltage sensitivity can be measured and evaluated by estimating an effective or dynamic short circuit ratio (DSCR) at a point of interconnection of the power plant to the grid. In particular, the DSCR is a measure of the ratio of field current required to produce rated armature voltage at open circuit to the field current required to produce the rated armature current under three phase short circuit condition. The DSCR may therefore be determined as a manner of representing the operating characteristics of the renewable energy generators, and various methods are known in the art for this purpose. For example, WO2021/001002 A1 discloses a method for estimating components of an impedance of a power grid from measurements of the power supply at the point of interconnection and thereby deriving an estimate of the DSCR at the point of interconnection. The method therefore allows for recalculation of the DSCR as it varies over time due to changes in the power grid, indicating the grid strength and voltage stability.

Typically, for a given offshore wind farm, the turbine manufacturer requires a minimum grid strength at a connection point to each wind turbine to avoid undesirable effects, such as inter-turbine converter control interactions leading to grid instability. Hence, if the grid strength falls below a minimum threshold, the Transmission System Operator (ISO) curtails power from the wind park (until a technical solution is found) to avoid sustained system instability.

Such intervention is prompted by even a temporary, time limited, reduction in grid strength (e.g. due to high wind penetration during early morning periods into lightly loaded isolated grids with reduced synchronous power infeed), which results in long term curtailment of active power (especially with large offshore wind parks) and therefore large losses of revenue.

It is an aim of the present invention to address one or more of the disadvantages associated with the prior art.

SUMMARY OF THE INVENTION

According to an aspect of the present invention, there is provided a method of operating a renewable energy power plant connected to a power network at a point of interconnection. The renewable energy power plant comprises: one or more renewable energy generators connected to a collection point of the renewable energy power plant, and a connecting network connecting the collection point to the point of interconnection The method comprises: receiving one or more measurement signals indicative of measured power characteristics of the renewable energy power plant at the point of interconnection; determining a dynamic short circuit ratio (DSCR) at the point of interconnection based on the one or more measurement signals; determining an equivalent dynamic short circuit ratio (EDSCR) at the collection point based on the determined DSCR at the point of interconnection and one or more components of an impedance of the connecting network; and controlling the one or more renewable energy generators by determining and dispatching active power set points based on the determined EDSCR.

In this manner, the invention controls the active power level of the renewable energy generator based on the equivalent dynamic short circuit ratio (EDSCR) at the collection point (where the grid strength is weakest) to improve the grid stability and take advanced measures to avoid intervention from the transmission system operator.

The benefit of this is that a temporary curtailment can be implemented to stabilise the grid and sustain power generating operation, maximising revenue generation whilst ensuring safe operation.

In the present context the term 'power network' should be interpreted to mean the power network to which the renewable energy power plant is connected to. Power network is also called 'power grid' or 'grid' in the present document.

For example, the collection point may be one of a plurality of substation power buses connected to the point of interconnection by the connecting network, one or more renewable energy generators being connected to each substation power bus. In this manner, the renewable energy power plant may include a plurality of sub-plants each comprising one or more renewable energy generators.

In an example, the method further comprises: comparing the determined EDSCR to a lower threshold SCR value; and selectively determining and dispatching the active power set points based on the determined EDSCR in dependence on the comparison. The lower threshold SCR may, for example, corresponds to a minimum EDSCR value at the collection point, optionally with an additional safety/stability margin.

Optionally, the active power set points are determined based on the determined DSCR and the determined EDSCR.

In an example, the active power set points may be determined using a look-up table, and/or a graph comprising one or more parametrized curves, relating reference active power levels to respective values of the EDSCR and/or the DSCR. For example, the graph may include a plurality of parametrized curves corresponding to respective values of the DSCR. Each parametrized curve may relate reference reactive power levels to respective values of the EDSCR. In this manner, the active power set points may be determined taking into account both the DSCR and the EDSCR values. The active power set points may be determined based on the parameterized curve corresponding to the determined DSCR value.

Optionally, each parameterized curve may be associated with a respective range of DSCR values for a respective EDCSR value. In this manner, the same parameterized curve may be used for relatively small variations of the DSCR, before a jump to the next parameterized curve following a more significant change. This arrangement helps to avoid limit cycling. Optionally, the active power reference level is determined using the parameterised curve associated with DSCR values that are closest to the determined DSCR value, whilst being less than or equal to the determined DSCR value. In this manner, a safety margin is provided.

In an example, the active power set points are determined using a ramp rate limit and the ramp rate limit is determined for ramping the active power level of the active power set points from a current active power level to the reference active power level. In other words, the ramp rate limit specifies a limit for the rate of change of the active power for safe operation of the renewable energy generators.

Optionally, the one or more measurement signals are indicative of a voltage across the point of interconnection; an active current, and/or an active power, delivered by the power plant to the power grid; and a reactive current, and/or a reactive power, delivered by the power plant to the power grid. Optionally, determining the DSCR at the point of interconnection comprises determining one or more components of an impedance of the power network by: estimating a parameter estimation vector based on the one or more measurement signals using a recursive adaptive filter algorithm, the parameter estimation vector defining a set of estimated model parameters for a selected model of system response of the power grid, creating a model representation of the power grid on the basis of the parameter estimation vector, and by applying the set of parameters of the parameter estimation vector to the selected model; calculating a system DC gain vector for the power grid, using the model representation, the DC gain vector representing a correlation between voltage across the point of interconnection, on the one hand, and active current and/or active power; and reactive current and/or reactive power; delivered by the power plant to the power grid, on the other hand, at steady state of the power grid; and deriving the one or more components of the impedance of the power network from the system DC gain vector.

In an example, the method further comprises: detecting when the determined EDSCR falls below the lower threshold SCR value; and setting one or more parameters for controlling the renewable energy generators during a fault-ride through mode of operation in dependence thereon, optionally, wherein the one or more parameters are adjusted using a look-up table to match predetermined values for fault ride-through response to a weak grid. In this manner, such parameters are adjusted to suit the grid strength and the SCR.

Optionally, the one or more parameters include: one or more low-voltage ride-through parameters of the one or more renewable energy generators, one or more parameters for reduction of fast fault current injection during the fault; and/or one or more parameters for reduced slope active power recovery after the fault. The one or more parameters may subsequently be restored in dependence on the determined EDSCR rising above the lower threshold SCR value.

In an example, the active power set points are dispatched to the one or more renewable energy generators to control an amount of curtailment of the one or more renewable energy power generators when the active power set points are less than the available power; and the active power set points are determined and dispatched to maintain the active power at a lower threshold amount of curtailment when the determined active power reference level is less than the lower threshold. In this manner, The active power set points may be maintained at the lower threshold amount of curtailment, which may be at least 50%, preferably at least 60% of the available power. Optionally, the number of renewable energy generators generating power may be maximised during such curtailment. Optionally, when the determined active power reference level is less than a further lower threshold amount of curtailment (i.e. a second lower threshold amount of curtailment), the active power set points may be determined and dispatched to ramp the active power down towards zero or a pre-programmed active power level.

Optionally, the EDSCR is determined using the following equation:

$$EDSCR = \frac{1}{\Sigma(Z_{pu\_park}) + \frac{1}{DSCR}}$$

Where $Z_{pu\_park}$ is formed by the one or more components of the impedance of the connecting network.

In an example, the collection point is an offshore power bus for an offshore wind park and the point of interconnection is an onshore point of connection to the power network. The connecting network may comprise a first transformer, a transmission line and a second transformer for connecting the offshore wind park to the onshore point of interconnection. Optionally, the plant may be a hybrid power plant.

According to an aspect of the invention, there is provided a computer-readable storage medium comprising instructions that, when executed by a computer, cause the computer to perform the method described above.

According to another aspect of the invention there is provided a power plant controller for controlling operation of a renewable energy power plant connected to a power network at a point of interconnection. The renewable energy power plant comprises: one or more renewable energy generators connected to a collection point of the renewable energy power plant, and a connecting network connecting the collection point to the point of interconnection. The power plant controller is configured to execute machine readable instructions to: receive one or more measurement signals indicative of measured power characteristics of the renewable energy power plant at the point of interconnection; determine a dynamic short circuit ratio (DSCR) at the point of interconnection based on the one or more measurement signals; determine an equivalent dynamic short circuit ratio (EDSCR) at the collection point based on the determined DSCR at the point of interconnection and one or more components of an impedance of the connecting network; and control the one or more renewable energy generators by determining and dispatching active power set points based on the determined EDSCR.

Within the scope of this invention it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, the present invention relates to methods and systems for controlling a renewable energy power plant to maintain an adequate grid strength and ensure safe operation of the power plant, whilst mitigating intervention from the TSO.

For this purpose, the methods and systems of the present invention are configured to receive measurement signal(s) indicative of measured power characteristic(s) of the renewable energy power plant at a point of interconnection to a power network. The measurement signal(s) are used to determine component(s) of an impedance of the power network and a dynamic short circuit ratio (DSCR) at the point of interconnection.

From these parameters, the invention determines an equivalent dynamic short circuit ratio (EDSCR) at a collection point, such as a substation power bus, to which one or more renewable energy generators of the power plant are connected. In turn, the EDSCR is used by a power plant controller to provide real-time control of the one or more renewable energy generators by determining and dispatching active power set points.

The benefit of this is that the stability and strength of the grid can be increased by reducing the active power levels following a drop in the DSCR to maintain the EDSCR above a lower threshold that would otherwise lead to intervention from the TSO. Hence, temporary curtailment can be implemented to stabilise the grid and sustain power generating operation, whilst ensuring system stability.

Figure 1:
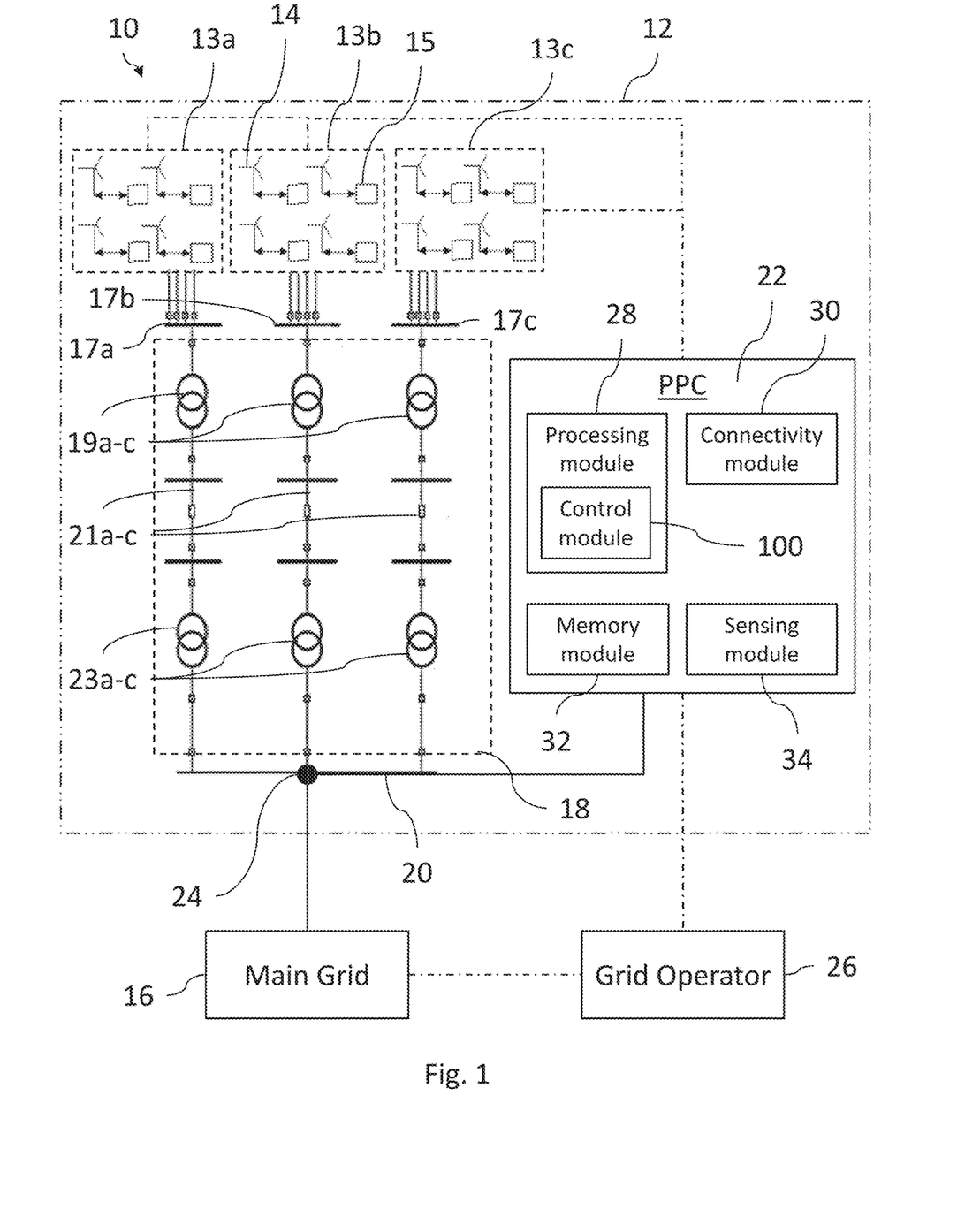
FIG. 1 shows schematically a power network connected to a renewable energy power plant that includes a power plant controller.

FIG. 1 illustrates a typical architecture in which a renewable energy power plant is connected to a main grid or wider power network. In the example shown in FIG. 1, the renewable energy power plant is a wind power plant (WPP). As will be understood by the skilled reader, a WPP comprises a plurality of wind turbine generators (WTG), which may be grouped into one or more sub-parks connected together at a single or respective collector points, e.g. in the form of substation power buses. A WTG is commonly referred to as a 'wind turbine'. The example shown is representative only and the skilled reader will appreciate that other specific architectures are possible. In other examples, the power plant may include other renewable energy sources such as a solar power plant, a bio energy power plant, an ocean/wave/tidal energy plant, or a hybrid power plant having a combination of different types of renewable energy power plants. Thus, the invention relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition, or as alternatives, to the components shown and described in FIG. 1. Such changes would be within the capabilities of the skilled person.

FIG. 1 shows a power system 10 incorporating a WPP 12. In this example, the WPP 12 includes a plurality of WTGs 14 and a power plant controller 22, referred to hereafter as PPC 22. Each of the plurality of WTGs 14 converts wind energy into electrical energy, which is transferred from the WPP 12 to a main power network, or 'main grid' 16, as active power and/or current, for distribution.

Although not illustrated in FIG. 1, the WPP 12 may also include compensation equipment, such as a static synchronous compensator (STATCOM) or another type of synchronous compensator, configured to provide reactive power or reactive current support as required. The WPP 12 may also include a battery energy storage system.

As is typically the case for an offshore WPP, the WTGs 14 are shown to be grouped into respective sub parks 13a-c and connected together at respective collection points, that may be referred to herein as substation power buses 17a-c. Each sub-park 13a-c may relate to a cluster of WTGs 14 in a respective offshore area, for example. However, this example is not intended to be limiting on the scope of the invention.

The WPP 12 also includes a connecting network 18 for connecting the WPP 12 to the main grid 16 (also called the main power network). Connecting networks are known in the art and typically comprise a combination of transmission lines, buses and/or transformers to couple the WPP 12 to the main grid 16. Other components such as circuit breakers, reclosers, and other systems known in the art may also be incorporated into the connecting network.

The WPP 12 and the main grid 16 are connected at a Point of Interconnection (PoI) 20, which is an interface between the WPP 12 and the main grid 16. The PoI 20 may also be referred to as the Point of Common Coupling, which may be abbreviated to 'PCC' or 'PoCC'.

In this example, the connecting network 18 is shown to include a two-substation transformer transmission link for connecting each substation power bus 17a-c to the PoI 20. Each two-substation transformer transmission link features a first transformer 19a-c, a transmission link 21a-c, and a second transformer 23a-c, connected in series between each substation power bus 17a-c and the PoI 20. The first transformer 19a-c steps up the voltage from the substation power bus 17a-c for transmission along the transmission link 21a-c, which typically extends from an offshore substation to an onshore site, featuring the second transformer 23a-c. The second transformer 23a-c steps-up the voltage further to satisfy the grid requirements at the PoI 20.

It shall be appreciated that the impedance of the connecting network 18 has the effect of reducing the stability and grid strength at the turbine collection points 17a-c, relative to the PoI 20. Hence, as shall be described in more detail, it is an aim of the present invention to monitor the voltage stability and grid strength at the turbine collection points 17a-c and to control the power output from the WPP 12 in dependence thereon to maintain the grid strength above minimum requirements set for the WPP 12.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current, and/or power, requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The Power Plant Controller (PPC) 22 is connected to the main grid 16 at a Point of Measurement (PoM) 24 and is connected to the WTG controllers 15. For example, as shall be described in more detail, the PPC 22 may be configured to receive one or more measurement signals from the PoM 24 comprising measurements of the power supply from the WPP 12 to the main grid 16 and/or a frequency level of the main grid 16. The role of the PPC 22 is to act as a command and control interface between the WPP 12 and the grid 16, and more specifically, between the WPP 12 and a grid operator 26, such as a transmission system operator (TSO) or a distribution system operator (DSO). The WPP 12 is capable of altering its power or current output in reaction to commands received from the PPC 22.

The PPC 22 is a suitable computer system for carrying out the controls and commands as described herein and so may incorporate a processing module 28, a connectivity module 30, a memory module 32 and a sensing module 34, as shown in FIG. 1.

The connectivity module 30, the memory module 32, and/or the sensing module 34 are configured to provide the processing module 28 with information that is indicative of a voltage level, a current level, an active power level, and/or a reactive power level supplied to the PoI 20 by the WPP 12. For example, the sensing module 34 may receive such information directly from one or more connected sensors (e.g. at the PoM 24) and communicate the information to the processing module 28. The PPC 22 may also receive information regarding the grid 16 and/or local buses, substations and networks from an energy management system (not shown).

As part of its operation, the PPC 22 generates and sends dispatch signals to the WTG controllers 15 to control one or more power characteristics of the WTGs 14. For example, the dispatch signals may be configured to control the active power output, the reactive power output, and/or the voltage level, of the WTGs 14. The WTG controllers 15 control the WTGs 14 according to set points contained within the dispatch signals. Hence, when the active power level of the set points is less than an available power determined from a wind speed measurement, the WTG controllers 15 may be configured to curtail the WTGs 14 accordingly to satisfy the set points.

In embodiments of the present invention, the PPC 22 is configured to provide real-time control of the active power output to maintain an adequate grid strength at each collection point, or substation power bus 17a-c, and thereby to ensure safe operation of the WPP 12, whilst mitigating intervention from the TSO 26.

For this purpose, the PPC 22 may include a program, algorithm, or "control module" 100, in accordance with an embodiment of the invention, for estimating the grid strength at the substation power buses 17a-c and determining and dispatching active power set points based on such estimates to maintain an adequate grid strength. The control module 100 may form part of the processing module 28 of the PPC 22, as shown in FIG. 1 for example.

The control module 100 is configured to receive measurement signal(s) indicative of measured power characteristics of the WPP 12 at the PoI 20. Such power characteristics may include a voltage across the PoI 20; an active current, and/or an active power, delivered by the WPP 12 to the power grid 16; and a reactive current, and/or a reactive power, delivered by the WPP 12 to the power grid 16. Based on such measured power characteristic(s), the control module 100 is configured to determine one or more components of an impedance of the power network 16, and a dynamic short circuit ratio (DSCR) at the PoI 20.

For this purpose, the control module 100 may include one or more models of the system response of the power grid 16 and/or one or more algorithms for estimating parameter(s) of such models. The skilled person would appreciate that various model architectures and algorithms in the art would be suitable for such purposes, which are not described in detail here to avoid obscuring the invention.

However, to give an example, the control module 100 may be configured to create a state space representation of the power grid 16, substantially as described in detail in WO2021/001002 A1. WO2021/001002 A1 is therefore incorporated herein by reference and describes a method of estimating components of a grid impedance and thereby deriving an effective SCR at the point of interconnection of a power generating unit, such as the collective WTGs 14 of the WPP 12, to a power grid, such as the main grid 16, which is therefore applicable to determining the DSCR in the present invention.

Accordingly, in order to determine the parameters of such a model, the control module 100 may include a recursive adaptive filter algorithm, such as a recursive least square algorithm and/or a Kalman algorithm, for estimating a parameter estimation vector based on the measurement signal(s). In general, it shall therefore be appreciated that the parameter estimation vector defines a set of estimated model parameters for a selected model of system response of the power grid 16, which may take the form of a state space representation for example.

From the model representation, the control module 100 may be configured to calculate a system DC gain vector for the power grid 16, where the DC gain vector represents a correlation between voltage across the PoI 20, on the one hand, and active current and/or active power; and reactive current and/or reactive power; delivered by the WPP 12 to the power grid 16, on the other hand, at steady state of the power grid 16. The control module 100 may be further configured to derive the component(s) of the impedance of the power network 16 from the system DC gain vector and, in turn, to derive the DSCR from the derived impedance. In particular, the DSCR at the PoI 20 can be derived as the inverse of the per unit value of the determined grid impedance.

The DSCR at the PoI 20 is an approximate measure of the stability of the WTGs 14 and the Available Fault Level (AFL) per sub-park 13a-c becomes less with reduction of grid DSCR.

However, as the connecting network 18 introduces further impedance to the WPP 12, the grid strength is reduced at the collection points 17a-c, where the grid strength is weakest. The control module 100 is therefore further configured to determine the EDSCR at each substation power bus 17a-c based on the DSCR determined at the PoI and the impedance of the connecting network 18 extending therebetween.

The impedance of the connecting network 18 is determined by the specific design of the WPP 12, which may be stored in the memory module 32 of the PPC 22, for example, and recalled on demand or otherwise determinised based on active and/or reactive power measurements.

In order to determine the EDSCR at each substation power bus 17*a-c*, the control module 100 may further include one or more rules, algorithms or equations relating the DSCR determined at the PoI 20 and the impedance of the connecting network 18 to the EDSCR at the substation power bus 17*a-c*. To give an example, the following equation may be stored in the control module 100:

$$EDSCR = \frac{1}{\Sigma(Z_{pu\_park}) + \frac{1}{DSCR}} \quad (1)$$

Where DSCR is the DSCR value determined at the PoI 20, $Z_{pu\_park}$ is formed by the per unit impedance of the connecting network 18 determined between the PoI 20 and the respective substation power bus 17*a-c*, and EDSCR is the EDSCR value calculated at the respective substation power bus 17*a-c*.

Additionally, the control module 100 is configured to control one or more power characteristics of the WTGs 14 in real-time in dependence on the EDSCR. The one or more power characteristics of the WTGs 14 controlled by the control module 100 may, for example, include an active power output, a reactive power output, and/or a voltage level, of one or more of the WTGs 14. Nonetheless, for the sake of simplicity, in the following description the example control module 100 is configured to control the active power output of the WTGs 14 and the determined set points are active power set points for controlling said active power output. This example is not intended to be limiting on the scope of the invention though.

The active power set points may be determined based, at least in part, on the determined EDSCR at the plant power bus 17*a-c* and, optionally, the DSCR at the PoI 20, such that the active power output varies in a corresponding manner with those determined parameters.

For this purpose, the control module 100 may include one or more functions, algorithms, look-up tables, graphs or other references storing a relationship between a reference active power level and respective values of the DSCR and the EDSCR.

Figure 2:
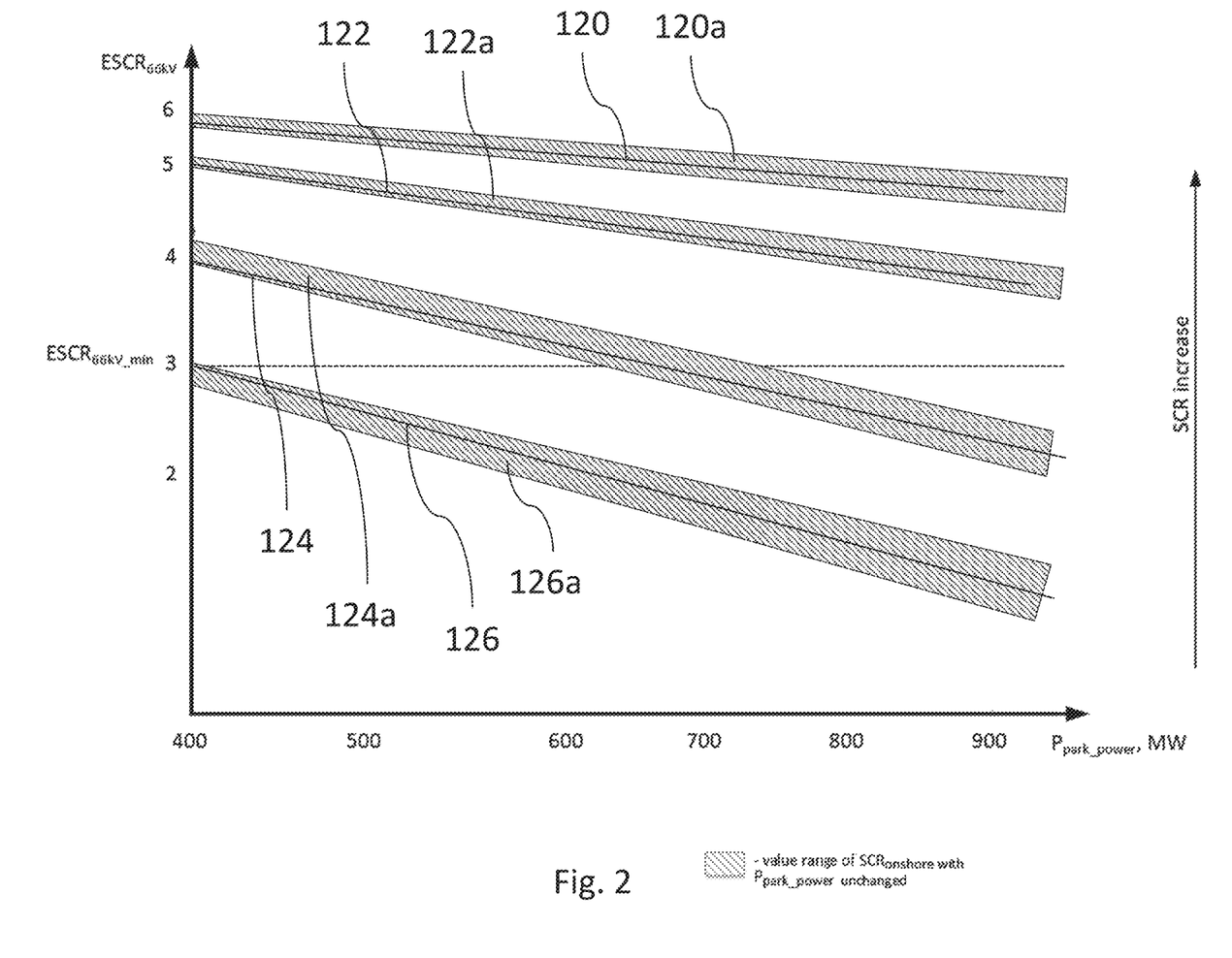
FIG. 2 shows an example Power-SCR graph of the power plant controller of FIG. 1.

In an example in accordance with an embodiment of the invention, the control module 100 may include a Power-SCR graph, as shown in FIG. 2, comprising reference active power levels for respective DSCR and EDSCR values. The Power-SCR graph shown in FIG. 2 is of a type that would be familiar to the skilled person.

In particular, as shown in FIG. 2, the graph includes a plurality of parametrized curves 120-126 corresponding to respective values of the DSCR, where each curve 120-126 relates reference active power levels to respective values of the EDSCR. It shall be appreciated from the example in FIG. 2 that the slope of successive curves 120-126 on the graph may increase, and the intersection point may decrease, as the DSCR value reduces. In this example, each parameterized curve 120-126 is associated with a respective range of DSCR values for a respective EDCSR value to avoid limit cycling until a significant change in grid strength occurs, producing a sudden change in the estimated DSCR. In other words, each curve may therefore include a DSCR deadband 120*a*-126*a* for each EDCSR value, such that the active power reference level remains substantially constant during minor fluctuations of the determined DSCR. When the DSCR value shifts outside of the deadband 120*a*-126*a*, there is a jump to the next parametrized curve 120-126 associated with DSCR values that are closest to the determined DSCR value, whilst being less than or equal to the determined DSCR value.

As shall be appreciated from the graph shown in FIG. 2, following a drop in grid strength, shifting to a lower parameterised curve 122-126, a power reduction may be required in order to maintain the EDSCR value above a lower threshold SCR value.

The control module 100 may further store one or more predetermined ramp rates and/or ramp rate limits for determining the active power set points based on a current active power level and the determined reference active power level. For example, the control module 100 may store a look-up table comprising pre-determined ramp rates for respective differences between the current active power level and the determined reference active power level. The look-up table may additionally include one or more predetermined ramp up, or ramp down rates, corresponding to respective frequency level measurements, or changes in the measured frequency level, for example.

Various methods are known in the art for determining active power set points and it shall be appreciated that the above examples are not intended to be limiting on the scope of the invention.

The active power set points are dispatched to the WTGs 14 to control, in real-time, a target value for the active power output of the WPP 12 to the PoI 20. Hence, the active power set points control an amount of curtailment of the WTGs 14 when the active power set points are less than the available power. In examples, the PPC 22 may be configured to control curtailment of the WTGs 14 down to a threshold of allowable curtailment, e.g. 60% of the available wind power. Accordingly, the PPC 22 may further receive an amount of available power, as may be derived from the wind speed, for example, and when the determined active power reference level is less than the threshold percentage of the available power, the PPC 22 may be configured to output set points at an active power corresponding to the threshold curtailment. For example, the PPC 22 may be configured to output active power set points at the threshold curtailment for a predetermined period until the DSCR increases.

The operation of the control module 100 shall now be described with additional reference to FIGS. 3 to 5.

Figure 3:
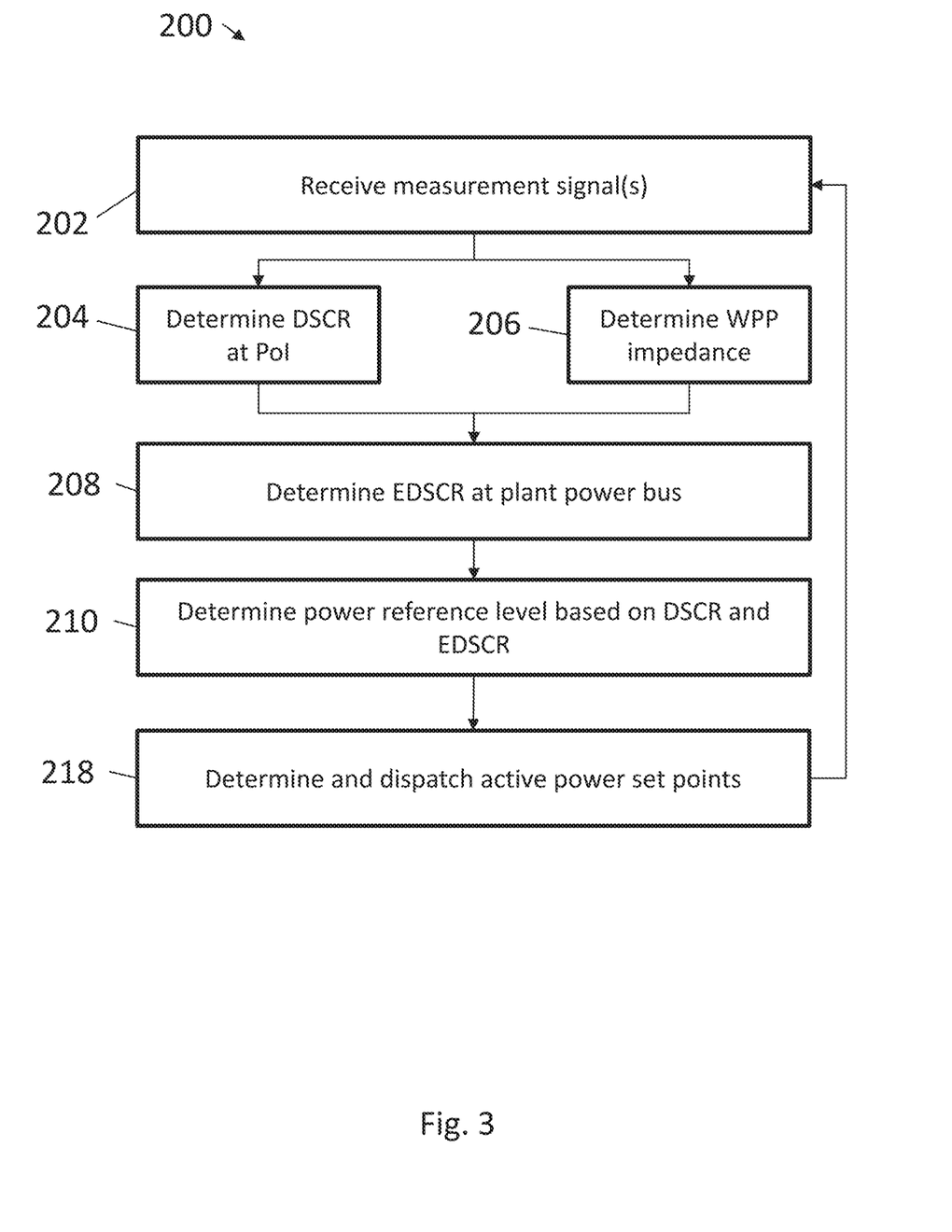
FIG. 3 shows a method, in accordance with an embodiment of the invention, of operating the power plant of FIG. 1.
Figure 4:
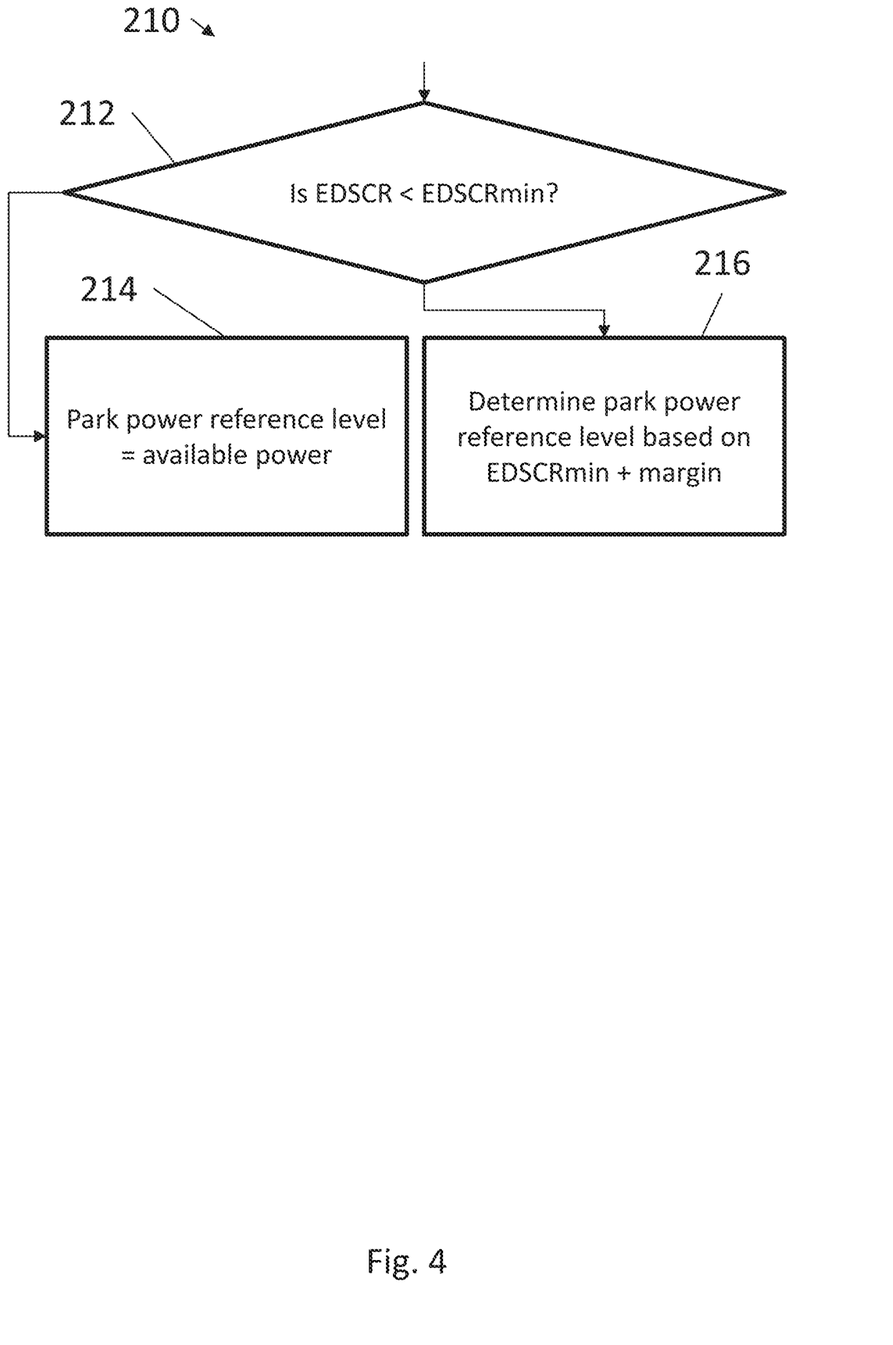
FIG. 4 shows examples sub-steps, in accordance with an embodiment of the invention, of the method shown in FIG. 3.

FIG. 3 shows an example method 200 of controlling the active power output of the WPP 12 in accordance with an embodiment of the invention.

In step 202, the PPC 22 receives one or more measurement signals indicative of measured power characteristics at the PoI 20. In this example, such power characteristics include a voltage across the PoI 20; an active current, and/or an active power, delivered by the WPP 12 to the power grid 16; and a reactive current, and/or a reactive power, delivered by the WPP 12 to the power grid 16. However, this example is not intended to be limiting on the scope of the invention and, in other examples, measurements of one of more other power characteristics may be received for the purposes of determining the DSCR at the PoI 20.

In step 204, the PPC 22 determines the DSCR at the PoI 20 based on the one or more measurement signals received in step 202. In this example, the DSCR is determined according to the method disclosed in WO2021/001002 A1, which is incorporated herein by reference. In particular, the DSCR is calculated by initially determining one or more components of the impedance of the main grid 16 using a model representation of the grid response and an algorithm for estimating the parameters of the model.

Accordingly, in step 204, the PPC 22 may estimate a parameter estimation vector for a state space representation of the of the grid response. The state space representation may take the form:

$$x(t) = Ax(t) + Bu(t)$$
$$y(t) = Cx(t) + Du(t), D = 0$$
$$\begin{bmatrix} x_1(t) \\ x_2(t) \end{bmatrix} = \begin{bmatrix} a1 & a2 \\ a3 & a4 \end{bmatrix} \begin{bmatrix} x_1(t) \\ x_2(t) \end{bmatrix} + \begin{bmatrix} b1 & b2 \\ b3 & b4 \end{bmatrix} \begin{bmatrix} I_P(t) \\ I_Q(t) \end{bmatrix}$$
$$y(t) = [c1 \quad c2] \begin{bmatrix} x_1(t) \\ x_2(t) \end{bmatrix}, y(t) = V_s(t) + V_{dyn}(t)$$

where A, B, C and D are matrixes, u(t) represents input to the state space model, at time t, in the form of the active current, $I_P(t)$, and the reactive current, $I_Q(t)$, respectively, at time t, y(t) represents the output of the state space model, at time t, in the form of the voltage across the PoI 20, $I_P(t)$ is the active current delivered by the WPP 12 to the power grid 16, $I_Q(t)$ is the reactive current delivered by the WPP 12 to the power grid 16, and $V_2(t)$ is a static part of the voltage across the PoI 20, and $V_{dyn}(t)$ is a dynamic part of the voltage across the PoI 20.

Hence, the step of estimating a parameter estimation vector comprises estimating parameters for the matrixes A, B, C and D. The parameter estimation vector may be determined based on the one or more measurement signals using a recursive adaptive filter algorithm, which is not described in detail here to avoid obscuring the present invention. The PPC 22 may then create or update the model representation of the power grid 16 on the basis of the parameter estimation vector and calculate a system DC gain vector for the power grid, using the model representation. The DC gain vector may be determined according to the equation:

$$K_{DC} = D - CA^{-1}B$$

where $K_{DC}$ is the system DC gain vector, and A, B, C and D are the matrixes of the state space representation.

In this context, the DC gain vector represents a correlation between voltage across the PoI 20, on the one hand, and active current and/or active power; and reactive current and/or reactive power; delivered by the WPP 12 to the power grid 16, on the other hand, at steady state of the power grid 16. The calculated system DC gain is therefore an easy manner of representing the grid impedance and so the PPC 22 may derive one or more components of the impedance of the power network from the system DC gain vector and determine the DSCR at the PoI 20 as the inverse of the magnitude of the determined impedance of the power grid 16.

In step 206, the PPC 22 determines the impedance of the connecting network 18 of the WPP 12, for example by recalling a per unit impedance value calculated for the connecting network 18 from the memory module 32 of the PPC 22.

In step 208, the PPC 22 determines the equivalent DSCR at each collection point or substation power bus 17*a-c* based on the determined impedance of the connecting network 18 and the determined DSCR at the PoI 20. For this purpose, the PPC 22 may make use of one or more algorithms, functions or equations that are known in the art.

To give an example, the PPC 22 may determine the EDSCR using Equation 1, defined above as:

$$EDSCR = \frac{1}{\Sigma(Z_{pu\_park}) + \frac{1}{DSCR}}$$

Where DSCR is the DSCR value determined at the PoI 20, $Z_{pu\_park}$ is formed by the per unit impedance of the connecting network 18 determined between the PoI 20 and the respective substation power bus 17*a-c*, and EDSCR is the EDSCR value calculated at the respective substation power bus 17*a-c*.

In step 210, the PPC 22 is configured to determine the active power reference level based on the DSCR and the EDSCR. By way of example, FIG. 4 shows example sub-steps 212 to 216 for determining the active power reference level, in accordance with an embodiment of the invention.

In this example, the PPC 22 operates the WTGs 14 of the WPP 12 to inject active and reactive power based on the grid frequency and voltage to provide frequency and voltage support to the main grid 16 during normal operation of the WPP 12. However, upon determining a weak grid strength, the PPC 22 is configured to take precautionary measures to reduce the active power output and strengthen the grid to avoid intervention from the ISO 26. Accordingly, in this example, in sub-step 212, the PPC 22 compares the determined EDSCR to a lower threshold SCR value to determine whether to implement such control measures.

The lower threshold SCR value may be prescribed according to the layout/configuration of the WPP 12, for example, and may include an additional safety margin to avoid a weak grid strength. The lower threshold may be an EDSCR value of at least 5, preferably at least 3, and can even be at least 1.

If the determined EDSCR is greater than the lower threshold SCR value, the PPC 22 determines the active power reference level, in sub-step 214, according to normal operation, for example based on the available wind speed.

However, if the determined EDSCR is at or below the lower threshold SCR value, the PPC 22 determines the active power reference level, in sub-step 216, based on the determined DSCR and EDSCR values.

In particular, in one such example, the PPPC 22 may be configured to determine the reference active power level using a Power-SCR graph, substantially as described in relation to FIG. 2. For this purpose, the PPC 22 may identify a parametrized curve 120-126 associated with the determined EDSCR value and corresponding SCR values that are as close to the determined SCR value as possible, whilst being less than or equal to said determined SCR value. Based on the identified parametrized curve 120-126, the PPC 22 may then read off a corresponding active power reference level associated with the lower threshold SCR value, optionally with a further safety margin.

Figure 5:
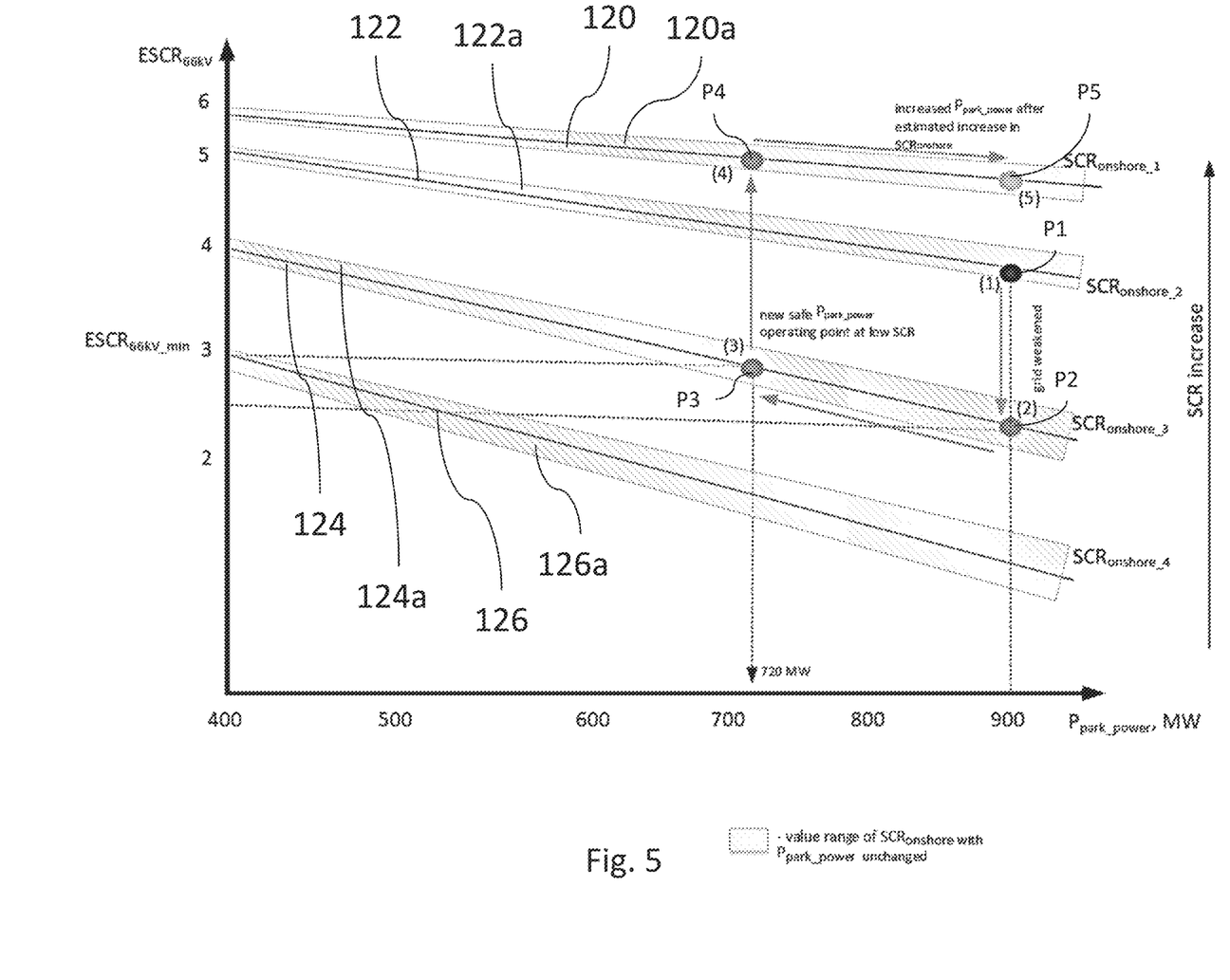
FIG. 5 shows an example series of active power reference levels determined using the Power-SCR graph shown in FIG. 2.

By way of example, FIG. 5 shows the active power reference levels determined for an example scenario.

Initially, at point P1, the determined DSCR and EDSCR values indicate that the grid strength is acceptable, and the operating point is depicted on a second 122 of four parametrized curves 120-126 (at a corresponding point above the lower threshold SCR value). However, grid strength at the point of interconnection can be weakened due to one or more combined factors, such as: a reduction of a synchronous power infeed due to increased renewable power penetration, loss of a radial line, and/or synchronous plant loss; reduced system loads resulting in reduced system damping; and/or increase of power electronics based renewable power connection near the point of interconnection and/or offshore power bus. Accordingly, following an event, such as tripping of a radial feeder, tripping of synchronous generator sources, and/or automatic decrease power from synchronous generating sources, the PPC 22 determines decreased DSCR and EDSCR values in steps 204 and 208 respectively. Consequently, the PPC 22 determines that the EDSCR is less than the lower threshold SCR value, in sub-step 212, and the PPC 22 determines that the EDSCR and DSCR values are associated with the reduced stability values of the third parametrized curve 124, as depicted by the point P2. The PPC 22 then determine a reduced active power reference level, according to the third parametrized curve 124, corresponding to an EDSCR value at the lower threshold SCR value (or another predetermined value that may include a safety margin), as illustrated by the point P3.

Returning to FIG. 3, in step 218, the PPC 22 determines and dispatches active power set points based on the determined reference active power level.

For this purpose, it shall be appreciated that the PPC 22 may determine the active power set points in accordance with one or more prescribed ramp rates or ramp rate limits (i.e. dP/dt) for transitioning from the current active power level to the determined reference active power level, thereby avoiding instability in the already Power/Voltage sensitive grid.

Various mathematical methods are known in the art for determining set points accordingly, which are not described in detail here to avoid obscuring the invention.

The determined active power set points are dispatched from the PPC 22 to the WTG controllers 15 which control the WTGs 14 accordingly to reduce the active power output of the WPP 12, thereby shifting the EDSCR towards the desired value. This has the effect of improving voltage stability and grid strength.

Hence, as the grid strength increases, the PPC 22 subsequently determines that the DSCR and EDSCR values have increased again such that the EDSCR is greater than the lower threshold SCR value and jumped to the first parameterized curve 120, as depicted by the point P4 on the graph shown in FIG. 4. Accordingly, the PPC 22 therefore resumes determining and dispatching active power set points according to the normal operation, as depicted by the point P5 on the graph, such that the power curtailment is only temporary and circumvents intervention from the TSO.

For context, it shall be appreciated that the EDSCR may, for example, be estimated on a typical iteration cycle of approximately 20 s while typical Voltage/reactive power grid oscillations may last 5-10 minutes. Additionally, it shall be appreciated that suitable delays may be applied to the determination and dispatch of active power set points, in step 218, to avoid limit cycling.

It is expected that the present invention will therefore improve grid stability and strength to ensure safe operation, whilst mitigating interventions from the TSO, and therefore contributing to greater power generating capabilities of the WPP 12.

It will be appreciated that various changes and modifications can be made to the examples described above without departing from the scope of the present invention.

For example, although the invention has been described in context of an offshore wind power plant connected to an onshore point of interconnection to the main grid 16, it shall be appreciated that the invention is not limited to such application and may instead provide a useful benefit to any renewable energy power plant having significant impedance between the point of interconnection to the main grid and a collection point for one or more renewable energy generators. Moreover, in other examples, it shall be appreciated that the WTGs 14 may be connected to a single collection point or plant power bus, or any number of sub-parks may be connected to respective collection points or plant power buses, for example in the form of respective substation power buses Additionally, although the example described above includes sub-step 212 for determining whether the EDSCR is less than a lower threshold SCR value, it shall be appreciated that, in other examples, the PPC 22 may control the active power output based, at least in part, on the determined DSCR and EDSCR, irrespective of such comparison. For example, the PPC 22 may determine an active power reference level using the Power-SCR graph, substantially as described above and determine the active power set points based, at least partially, on the determined active power reference level.

The active power set points are dispatched to the WTGs 14 to control, in real-time, a target value for the active power output of the WPP 12 to the PoI 20. The active power set points therefore control an amount of curtailment of the WTGs 14 implemented by the WTG controllers 15 when the active power set points are less than the available power. In examples, the PPC 22 may therefore be configured to control curtailment of the WTGs 14 down to a threshold of allowable curtailment, e.g. 60% of the available wind power. Accordingly, in step 218, the PPC 22 may further receive an amount of available power, as may be derived from the wind speed, for example, and when the determined active power reference level is less than the threshold percentage of the available power, the PPC 22 may be configured to output set points at an active power corresponding to the threshold curtailment. In this manner, the active power output may be maximally reduced whilst maintaining connection between the sub-parks 17*a-c* and maximising the number of WTGs 14 generating power. This maximises the park swept area for maximum capacity factor power production.

In an example, the PPC 22 may be further configured to set one or more parameters for controlling the renewable energy generators during a fault-ride through mode of operation in dependence on the determined EDSCR and, in particular, in dependence on the determined EDSCR falling below the lower threshold SCR value. For example, such parameters include: one or more low-voltage ride-through parameters of the one or more renewable energy generators, one or more parameters for reduction of fast fault current injection during the fault; and/or one or more parameters for reduced slope active power recovery after the fault.

For this purpose, the PPC 22 may include predetermined values for such parameters to implement order to match reliable fault ride-through response to grid weakening, i.e. in response to the determined EDSCR falling below the lower threshold SCR value. For example, the PPC 22 may include a look-up table storing calibrated values for adjusting the parameters.

Accordingly, in examples, the method 200 may further include steps for adjusting the fault-ride-through parameters in dependence on the determined EDSCR, for example where the determined EDSCR falls below the lower threshold SCR value.

Figure 6:
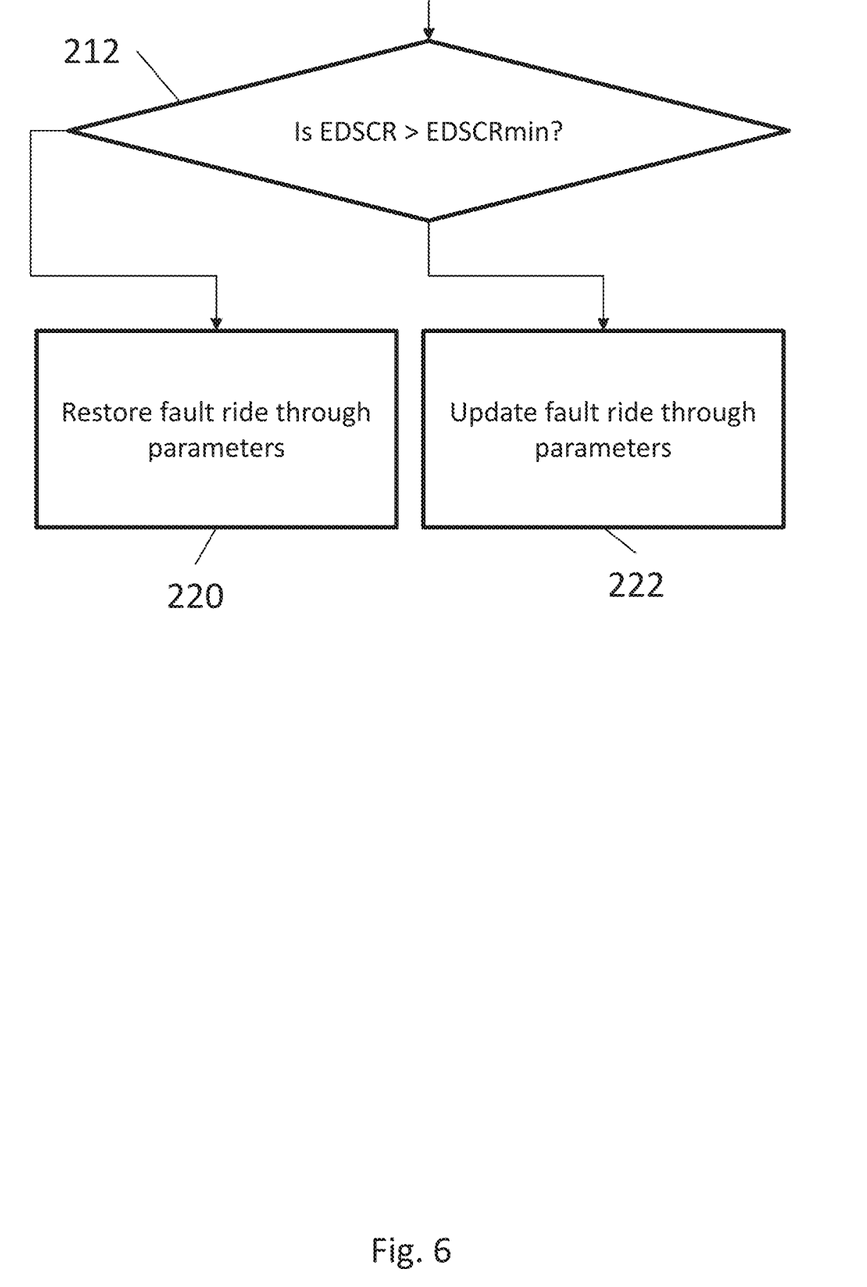
FIG. 6 shows examples sub-steps, in accordance with another embodiment of the invention, of the method shown in FIG. 3.

By way of example, FIG. 6 shows example sub-steps 220 and 222 for adjusting the fault-ride-through parameters in dependence on the determined EDSCR. In particular, once the PPC 22 has determined the EDSCR, in step 208, the PPC 22 may proceed to adjust the fault-ride through parameters, in sub-step 220, if it is determined in sub-step 212 that the determined EDSCR value is less than the lower threshold SCR value. In this manner, when the PPC 22 determines that the grid strength is weak, the PPC 22 adjusts fault-ride-through parameters, e.g. using a look-up table, to reliable parameters for a weak grid, such that the WPP 12 can react accordingly to a grid fault, e.g. where the frequency level and/or the voltage level of the grid moves outside of a normal operating range. Hence, grid stability can be maintained in spite of the weak grid strength. If the PPC 22 subsequently determines that the grid strength has improved and that the determined EDSCR has increased above the lower threshold SCR value, the PPC 22 may restore the fault-ride-through parameters to normal operation levels, in sub-step 222.

Hence, the invention adjusts the operating parameters of the WPP 12 upon detecting a weak grid to provide greater voltage and/or frequency stability in the event of a fault.

The invention claimed is:

1. A method of operating a renewable energy power plant connected to a power network at a point of interconnection, the renewable energy power plant comprising: one or more renewable energy generators connected to a collection point of the renewable energy power plant, and a connecting network connecting the collection point to the point of interconnection, the method comprising:
receiving one or more measurement signals indicative of measured power characteristics of the renewable energy power plant at the point of interconnection;
determining a dynamic short circuit ratio (DSCR) at the point of interconnection based on the one or more measurement signals;
determining an equivalent dynamic short circuit ratio (EDSCR) at the collection point based on the determined DSCR at the point of interconnection and one or more components of an impedance of the connecting network; and
controlling the one or more renewable energy generators by determining and dispatching, to the one or more renewable energy generators, active power set points based on the determined EDSCR (i) to control an amount of curtailment of the one or more renewable energy power generators when the active power set points are less than an available power and (ii) to maintain the active power at a lower threshold amount of curtailment when a determined active power reference level is less than the lower threshold.

2. The method according to claim 1, wherein the collection point is one of a plurality of substation power buses connected to the point of interconnection by the connecting network, one or more renewable energy generators being connected to each substation power bus.

3. The method according to claim 1, further comprising:
comparing the determined EDSCR to a lower threshold short circuit ratio (SCR) value; and
selectively determining and dispatching the active power set points based on the determined EDSCR in dependence on the comparison.

4. The method according to claim 1, wherein the active power set points are determined based on the determined DSCR and the determined EDSCR.

5. The method according to claim 4, wherein the active power set points are determined using at least one of look-up table, or a graph comprising one or more parametrized curves, relating reference active power levels to respective values of at least one of the EDSCR or the DSCR.

6. The method according to claim 5, wherein:
the graph includes a plurality of parametrized curves corresponding to respective values of the DSCR, each parametrized curve relating reference reactive power levels to respective values of the EDSCR; and
the active power set points being determined based on the parameterized curve corresponding to the determined DSCR value.

7. The method according to claim 6, wherein the active power reference level is determined using the parameterised curve associated with DSCR values that are closest to the determined DSCR value, whilst being less than or equal to the determined DSCR value.

8. The method according to claim 5, wherein the active power set points are determined using a ramp rate limit and the ramp rate limit is determined for ramping the active power level of the active power set points from a current active power level to the reference active power level.

9. The method according to claim 1, wherein the one or more measurement signals are indicative of at least one of (1) a voltage across the point of interconnection; (ii) an active current, or an active power, delivered by the power plant to the power grid; or (iii) a reactive current, or a reactive power, delivered by the power plant to the power network; and
wherein determining the DSCR at the point of interconnection comprises determining one or more components of an impedance of the power network by:
estimating a parameter estimation vector based on the one or more measurement signals using a recursive adaptive filter algorithm, the parameter estimation vector defining a set of estimated model parameters for a selected model of system response of the power network,
creating a model representation of the power network on the basis of the parameter estimation vector, and by applying the set of parameters of the parameter estimation vector to the selected model;
calculating a system DC gain vector for the power network, using the model representation, the DC gain vector representing a correlation between: (i) voltage across the point of interconnection, and (ii) at least one of active current or active power; and at least one of reactive current or reactive power; delivered by the power plant to the power grid, at steady state of the power grid; and
deriving the one or more components of the impedance of the power network from the system DC gain vector.

10. The method according to claim 1, further comprising: detecting when the determined EDSCR falls below the lower threshold SCR value; and setting one or more parameters for controlling the renewable energy generators during a fault-ride through mode of operation in dependence thereon, optionally, wherein the one or more parameters are adjusted using a look-up table to match predetermined values for fault ride-through response to a weak grid.

11. The method according to claim 10, wherein the one or more parameters include at least one of:
one or more low-voltage ride-through parameters of the one or more renewable energy generators,
one or more parameters for reduction of fast fault current injection during the fault; or
one or more parameters for reduced slope active power recovery after the fault.

12. The method according to claim 1, wherein the EDSCR is determined using the following equation:

$$EDSCR = \frac{1}{\Sigma(Z_{pu\_park}) + \frac{1}{DSCR}}$$

Where $Z_{pu\_park}$ is formed by the one or more components of the impedance of the connecting network.

13. The method according to claim 1, wherein the collection point is an offshore power bus for an offshore wind park and the point of interconnection is an onshore point of connection to the power network, the connecting network comprising a first transformer, a transmission line and a second transformer for connecting the offshore wind park to the onshore point of interconnection.

14. A power plant controller for controlling operation of a renewable energy power plant connected to a power network at a point of interconnection, the renewable energy power plant comprising: one or more renewable energy generators connected to a collection point of the renewable energy power plant, and a connecting network connecting the collection point to the point of interconnection, the power plant controller being configured to execute machine readable instructions to:
- receive one or more measurement signals indicative of measured power characteristics of the renewable energy power plant at the point of interconnection;
- determine a dynamic short circuit ratio (DSCR) at the point of interconnection based on the one or more measurement signals;
- determine an equivalent dynamic short circuit ratio (EDSCR) at the collection point based on the determined DSCR at the point of interconnection and one or more components of an impedance of the connecting network; and
- control the one or more renewable energy generators by determining and dispatching, to the one or more renewable energy generators, active power set points based on the determined EDSCR (i) to control an amount of curtailment of the one or more renewable energy power generators when the active power set points are less than an available power and (ii) to maintain the active power at a lower threshold amount of curtailment when a determined active power reference level is less than the lower threshold.

* * * * *